(12) United States Patent
Wuttke et al.

(10) Patent No.: US 9,505,435 B2
(45) Date of Patent: Nov. 29, 2016

(54) METHOD FOR PULLING A VEHICLE INTO OR OUT OF A PARKING SPACE AND CORRESPONDING ASSISTANCE SYSTEM AND VEHICLE

(75) Inventors: Ulrich Wuttke, Braunschweig (DE); Philipp Hüger, Rühen (DE); Mehmet Terkes, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 381 days.

(21) Appl. No.: 13/697,348

(22) PCT Filed: Apr. 1, 2011

(86) PCT No.: PCT/EP2011/001660
§ 371 (c)(1),
(2), (4) Date: Jan. 18, 2013

(87) PCT Pub. No.: WO2011/141099
PCT Pub. Date: Nov. 17, 2011

(65) Prior Publication Data
US 2013/0110342 A1  May 2, 2013

(30) Foreign Application Priority Data

May 12, 2010  (DE) .................. 10 2010 020 208

(51) Int. Cl.
*B62D 15/02* (2006.01)
*B60W 30/06* (2006.01)
*G08G 1/16* (2006.01)
(Continued)

(52) U.S. Cl.
CPC .......... *B62D 15/0285* (2013.01); *B60W 30/06* (2013.01); *B60W 50/10* (2013.01); *B62D 15/025* (2013.01); *B62D 15/027* (2013.01); *B62D 15/028* (2013.01); *B62D 15/029* (2013.01); *G08G 1/168* (2013.01); *B60W 10/20* (2013.01); *B60W 50/14* (2013.01);
(Continued)

(58) Field of Classification Search
None
See application file for complete search history.

(56) References Cited

U.S. PATENT DOCUMENTS 4,931,930 A * 6/1990 Shyu ............... B60Q 9/007 180/167
6,326,887 B1 * 12/2001 Winner et al. ........... 340/435

(Continued)

FOREIGN PATENT DOCUMENTS

DE       10341156 A1    3/2005
DE     102004010752 A1   9/2005

(Continued)

OTHER PUBLICATIONS

Search Report for German Patent Application No. 10 2010 051 269.9; Aug. 22, 2011.

(Continued)

*Primary Examiner* — Fadey Jabr
*Assistant Examiner* — Kevin P. Mahne
(74) *Attorney, Agent, or Firm* — Barnes & Thornburg LLP

(57) ABSTRACT

A method wherein, when a vehicle is pulled into or out of a parking space, the dimensions of the parking space in which the vehicle is located or in which the vehicle is being pulled into are determined by an assistance system. Furthermore, the assistance system detects a distance between the vehicle and an obstacle. If the distance is below a threshold value, the assistance system produces a notice. The assistance system sets the threshold value according to the dimensions of the vehicle and the dimensions of the parking space.

14 Claims, 2 Drawing Sheets

(51) Int. Cl.
  *B60W 50/10* (2012.01)
  *B62D 1/00* (2006.01)
  *B60W 50/14* (2012.01)
  *B60W 10/20* (2006.01)

(52) U.S. Cl.
  CPC . *B60W 2050/143* (2013.01); *B60W 2050/146* (2013.01); *B62D 1/00* (2013.01)

(56) References Cited

U.S. PATENT DOCUMENTS

| | | |
|---|---|---|
| 2002/0128754 A1 | 9/2002 | Sakiyama et al. |
| 2003/0160717 A1* | 8/2003 | Mattes .................... G01S 13/87 342/70 |
| 2003/0210157 A1* | 11/2003 | Gotzig et al. .............. 340/932.2 |
| 2005/0137766 A1* | 6/2005 | Miyakoshi et al. ............ 701/36 |
| 2005/0195071 A1* | 9/2005 | Ewerhart et al. ............. 340/435 |
| 2005/0285758 A1* | 12/2005 | Matsukawa et al. ...... 340/932.2 |
| 2007/0010918 A1* | 1/2007 | Shimazaki et al. ............... 701/1 |
| 2007/0010938 A1* | 1/2007 | Kubota et al. ................ 701/200 |
| 2007/0268157 A1* | 11/2007 | Hess et al. ................. 340/932.2 |
| 2008/0231469 A1* | 9/2008 | Knoll .................... B60Q 9/006 340/932.2 |
| 2009/0259365 A1* | 10/2009 | Rohlfs et al. .................... 701/41 |
| 2009/0322565 A1* | 12/2009 | Faber ........................ 340/932.2 |
| 2010/0013670 A1* | 1/2010 | Hueppauff et al. ........ 340/932.2 |
| 2010/0017084 A1* | 1/2010 | Riegel .............................. 701/70 |
| 2010/0073152 A1* | 3/2010 | Nagamine et al. ........ 340/425.5 |
| 2010/0156671 A1* | 6/2010 | Lee et al. .................... 340/932.2 |
| 2010/0274446 A1* | 10/2010 | Sasajima et al. ................ 701/36 |
| 2011/0054739 A1* | 3/2011 | Bammert et al. ................ 701/41 |
| 2011/0063131 A1* | 3/2011 | Toledo et al. .............. 340/932.2 |
| 2011/0068953 A1* | 3/2011 | Toledo et al. .............. 340/932.2 |
| 2011/0080304 A1* | 4/2011 | Toledo et al. .............. 340/932.2 |
| 2011/0082613 A1* | 4/2011 | Oetiker et al. .................. 701/25 |
| 2011/0093168 A1* | 4/2011 | Barth et al. ..................... 701/41 |
| 2013/0229523 A1* | 9/2013 | Higgins-Luthman et al. ............................ 348/148 |

FOREIGN PATENT DOCUMENTS

| | | |
|---|---|---|
| DE | 102004049365 A1 | 4/2006 |
| DE | 102006058885 A1 | 6/2008 |
| DE | 102006062241 A1 | 6/2008 |
| WO | 03016122 A1 | 2/2003 |

OTHER PUBLICATIONS

Search Report for International Patent Application No. PCT/EP2011/001660; Jul. 1, 2011.

* cited by examiner

METHOD FOR PULLING A VEHICLE INTO OR OUT OF A PARKING SPACE AND CORRESPONDING ASSISTANCE SYSTEM AND VEHICLE

PRIORITY CLAIM

This patent application is a U.S. National Phase of International Patent Application No. PCT/EP2011/001660, filed 1 Apr. 2011, which claims priority to German Patent Application No. 10 2010 020 208.8, filed 12 May 2010, the disclosures of which are incorporated herein by reference in their entirety.

FIELD

Disclosed embodiments relate to a method for driving a vehicle automatically into a parking space or out of a parking space. Furthermore, disclosed embodiments relate to a correspondingly configured assistance system and to a correspondingly configured vehicle.

BACKGROUND

According to the prior art, on the one hand systems for semi-automatically driving a vehicle into or out of a parking space are known, and on the other hand systems which warn a driver, usually acoustically, about an obstacle during a parking process are known. Although, for example, DE 10 2006 058 885 A1 or DE 10 2004 010 752 A1 disclose improvements for the last-mentioned systems according to the prior art there is the problem that, for example, in the case of semi-automatic driving into a parking space a warning of a collision with an obstacle is unnecessarily issued.

The disclosed embodiments alleviate this problem.

SUMMARY

Disclosed embodiments provide a method for driving a vehicle into or out of a parking space as claimed in claim 1, by an assistance system as claimed in claim 6 and by a vehicle as claimed in claim 8. The dependent claims disclose further embodiments of the present invention.

A method for driving a vehicle into or out of a parking space using an assistance system is made available. In this context, a parking space in which the vehicle is located or in which the vehicle is to be parked is automatically measured in order to determine the dimensions of the parking space. During a parking space entering process or parking space exiting process of the assistance system, a distance between the vehicle and obstacles in the surroundings of the vehicle is continuously sensed automatically with sensors, for example by means of ultrasound sensors, and an indication is generated if the distance is below a predefined threshold value. In this context, the threshold value is set as a function of the dimensions of the vehicle and of the previously sensed dimensions of the parking space.

Since the threshold value is set as a function of the dimensions of the vehicle and of the parking space, the conditions under which an indication of a collision with an obstacle is generated can be advantageously adapted to the circumstances of the parking space. The indication of a collision can be of an acoustic nature, optical nature (for example a progress bar) or haptic nature (vibration of the steering wheel).

For example, the threshold value can be set lower the smaller the difference between the dimensions of the parking space and the dimensions of the vehicle. In this context, when the dimensions are compared, in particular the difference between the length of the parking space and the length of the vehicle is determined and the threshold value is set lower the smaller this difference.

As a result, it is advantageously possible that, for example, a continuous tone signal with which the driver is warned about a collision with an obstacle is not issued in the case of relatively small parking spaces until the distance of the vehicle from the corresponding obstacle is shorter than it is in the case of relatively large parking spaces.

BRIEF DESCRIPTION OF FIGURES

In the text which follows, the present invention will be explained in detail using disclosed embodiments and with reference to the single FIGURE.

DETAILED DESCRIPTION OF DISCLOSED EMBODIMENTS

Figure 1:
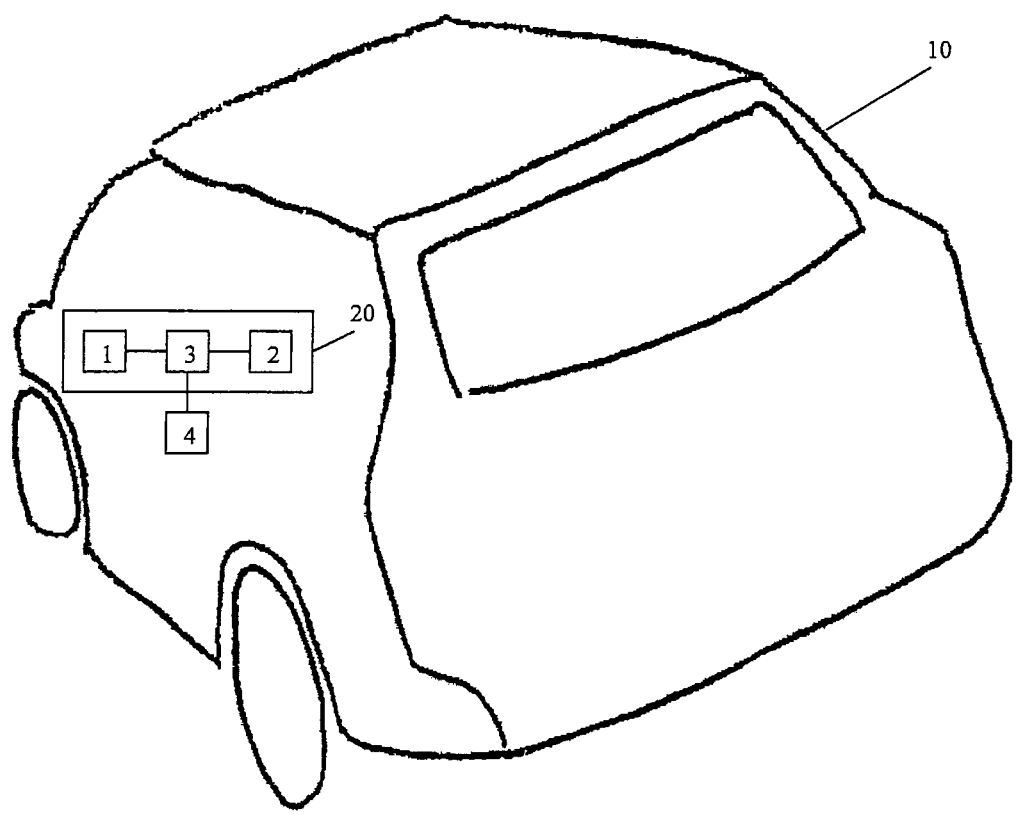
FIG. 1 is a schematic view of a vehicle having an assistance system.
Figure 2:
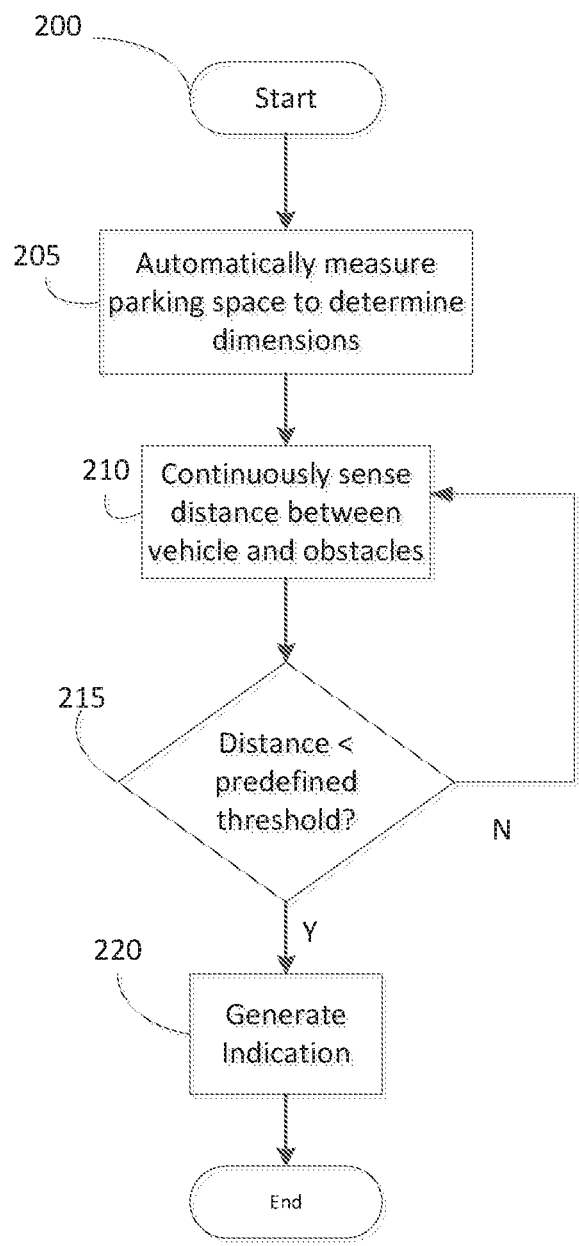
FIG. 2 is a flow chart of a method for driving a vehicle into or out of a parking space.

According to at least one disclosed embodiment, the threshold value is set as a function of the dimensions of the vehicle and of the parking space only if, in the case of semi-automatic driving of the vehicle into a parking space, the following conditions are met:

During the measurement of the parking space it was detected that the parking space is sufficiently large for the vehicle in order to be able to drive the vehicle semi-automatically into the parking space.

The assistance system was activated, for example, by the driver in order to drive the vehicle into the parking space.

The reverse gear speed of the vehicle is engaged. During the first maneuver during the driving into a parking space, the vehicle generally moves in reverse.

A steering intervention of the assistance system into a steering system of the vehicle is active, i.e. the steering system is actuated by the assistance system.

If the conditions described above are met, it is ensured that the vehicle is in a semi-automatic parking space entering process in which the lateral guidance or steering of the vehicle is carried out by the assistance system, and the longitudinal guidance (i.e. braking, acceleration, changing of gear speed) of the vehicle is carried out by the driver. According to this disclosed embodiment, the threshold value is changed only when the vehicle is in a semi-automatic parking space entering process, the change usually being accompanied by a reduction in the threshold value.

According to a further disclosed embodiment, the threshold value is set as a function of the dimensions of the vehicle and of the parking space only if the following conditions are met during the semi-automatic driving of the vehicle out of a parking space:

The parking space from which the vehicle is to drive out has been measured i.e. the dimensions of the parking space are known.

The assistance system has been activated, for example, by the driver in order to drive the vehicle out of the parking space.

The reverse gear speed or a forward gear speed of the vehicle is engaged.

A direction-of-travel indicator (flashing indicator) of the vehicle is set. During the driving out of the parking space, the flashing indicator must be activated according to the traffic regulations. This condition can be eliminated, for example, in countries in which the traffic regulations are not so strict.

A steering intervention of the assistance system into a steering system of the vehicle is active, i.e. the steering system is actuated by the assistance system.

If the conditions described above are met, it is ensured that the vehicle is in a semi-automatic parking space exiting process in which the lateral guidance of the vehicle is carried out by the assistance system and the longitudinal guidance of the vehicle is carried out by the driver. According to this disclosed embodiment, the threshold value is adapted to the size of the parking space only if the vehicle is in a semi-automatic parking space exiting process, which means, in particular, that the continuous tone range in the case of relatively small parking spaces does not occur until the vehicle is at a relatively short distance from an obstacle.

Disclosed embodiments also provide an assistance system for a vehicle. In this context, the assistance system comprises a device for generating an indication, a controller and one or more distance measuring sensors. The one or more distance measuring sensors are configured to sense dimensions of a parking space in which the vehicle is located or in which the vehicle wishes to park, and to sense a distance between the vehicle and an obstacle in the surroundings of the vehicle. The assistance system uses the device, for example loudspeakers of the vehicle, to generate the indication if the assistance system senses, using the distance measuring sensor or sensors, that the distance of the vehicle from an obstacle is below a predetermined threshold value. In the case of a semi-automatic parking space entering process or parking space exiting process, the assistance system adapts the threshold value to the dimensions of the vehicle and to the dimensions of the parking space, in particular to a difference between these dimensions, using the controller.

The advantages of the assistance system correspond substantially to the advantages of the method disclosed herein which have been explained above in detail, so that a repetition is avoided here.

Disclosed embodiments also provide a vehicle which comprises an assistance system.

The disclosed embodiments are suitable, in particular, for motor vehicles which are configured with an assistance system for semi-automatically driving in or out of a parking space. Of course, the disclosed embodiments are not restricted to this field of application since the disclosed embodiments can also in principle be used in motor vehicles which do not have an assistance system for semi-automatically driving into or out of a parking space and in which the driver still carries out the parking process completely manually. Furthermore, the disclosed embodiments can also be used for ships, aircraft or rail-bound vehicles or track-guided vehicles.

FIG. 1 is a schematic view of a vehicle 10 which comprises an assistance system 20 and a steering system 4. The assistance system 20 comprises, for its part, a plurality of ultrasound sensors 1, a controller 3 and loudspeakers 2. The assistance system 20 uses the ultrasound sensors 1 to measure a parking space in which the vehicle 10 is located or in which the vehicle 10 is to be parked. Furthermore, the assistance system 20 uses the ultrasound sensors 1 to determine a distance between the vehicle 10 and any obstacles in the immediate surroundings of the vehicle 10. If this distance is below a predetermined threshold value which can be changed, the assistance system 20 generates, by means of the controller 3 and the loudspeakers 2, an acoustic indication (for example a continuous tone) for the driver of the vehicle 10, which indication informs the driver that a collision of the vehicle 10 with the obstacle is imminent.

The assistance system 20 is also able to carry out a semi-automatic parking space entering process or parking space exiting process in which the controller 3 intervenes into the steering system 4 of the vehicle 10. During such a parking space entering process or parking space exiting process, the assistance system 20 adapts the threshold value as a function of the dimensions of the parking space and of the dimensions of the vehicle 10. For example, the threshold value can be set to 30 cm if the difference between the length dimension or length of the parking space and the length of the vehicle is greater than 1 m, with the result that the continuous tone is issued if the vehicle 10 is closer than 30 cm to an obstacle. If the difference between the length of the parking space and the length of the vehicle is shorter than 1 m, the threshold value can, for example, be restricted to 20 cm, with the result that the continuous tone is not issued until the vehicle 10 is closer than 20 cm to an obstacle. As a result it is advantageously possible for the assistance system 20 to carry out a semi-automatic parking space entering process or parking space exiting process, even in the case of small parking spaces, without the continuous tone being issued.

A method for driving a vehicle into or out of a parking space using an assistance system is made available 200. In this context, a parking space in which the vehicle is located or in which the vehicle is to be parked is automatically measured in order to determine the dimensions of the parking space 205. During a parking space entering process or parking space exiting process of the assistance system, a distance between the vehicle and obstacles in the surroundings of the vehicle is continuously sensed automatically 210 with sensors, for example by means of ultrasound sensors, and an indication is generated 215 if the distance is below a predefined threshold value 220. In this context, the threshold value is set as a function of the dimensions of the vehicle and of the previously sensed dimensions of the parking space.

The invention claimed is:

1. A method for assisting driving of a vehicle into or out of a parking space using an assistance system, the method comprising:

the assistance system determining dimensions of a parking space in which the vehicle is located or in which the vehicle will be parked;

sensing when an obstacle is present by the assistance system;

sensing a distance between the vehicle and the sensed obstacle;

setting a threshold value after the distance has been sensed, and generating an indication while entering or exiting the parking space only when a current sensed distance between the vehicle and the sensed obstacle is below the threshold value, wherein the threshold value is set as a function of dimensions of the vehicle and dimensions of the parking space following beginning of a first maneuver of a process for entering the parking space or for exiting the parking space;

wherein the threshold value is set as a function of the dimensions of the vehicle and of the dimensions of the parking space when driving into a parking space when the following conditions are met:
  the parking space which is sufficiently large for the vehicle to be semi-automatically driven into has been measured;
  the assistance system is activated;
  a reverse gear speed of the vehicle is engaged; and
  a steering intervention of the assistance system into a steering system of the vehicle is active.

2. The method of claim 1, wherein the threshold value is set lower than the smaller of the difference between the dimensions of the parking space and the dimensions of the vehicle.

3. The method of claim 1, wherein the threshold value is set as a function of a difference between a length of the parking space and a length of the vehicle.

4. The method of claim 1, wherein the threshold value is set as a function of the dimensions of the vehicle and of the dimensions of the parking space when driving out of a parking space when the following conditions are met:
  the parking space in which the vehicle is located has been measured; the assistance system is activated; a gear speed of the vehicle is engaged;
  a direction-of-travel indicator of the vehicle is activated; and
  a steering intervention of the assistance system into a steering system of the vehicle is active.

5. The assistance system of claim 1, wherein the threshold value is less than the sensed distance and is a smaller threshold value for relatively smaller sensed distances and a larger threshold value for relatively larger sensed distances.

6. The method of claim 1, wherein the threshold value is set as a function of dimensions of the vehicle.

7. An assistance system for a vehicle, the assistance system comprising:
  a device for generating an indication;
  a controller; and at least one distance measuring sensor, wherein the at least one distance measuring sensor determines dimensions of a parking space in which the vehicle is located or in which the vehicle will be parked and the at least one distance measuring sensor determines a distance between the vehicle and an obstacle,
  wherein the assistance system generates the indication by the device, only when the assistance system senses, by the at least one distance measuring sensor, that a current distance between the vehicle and the obstacle is below a threshold value during entering or exiting the parking space, and
  wherein, the controller sets the threshold value as a function of dimensions of the vehicle and dimensions of the parking space following the determination of a distance between the vehicle and the obstacle and following beginning of a first maneuver of a process for entering the parking space or for exiting the parking space.

8. The assistance system of claim 7, wherein the assistance system is configured to:
  determine dimensions of a parking space in which the vehicle is located or in which the vehicle will be parked;
  sense an obstacle is present by the assistance system;
  sensing a distance between the vehicle and the sensed obstacle; and
  generate an indication if the distance is below a threshold value,
  wherein the threshold value is set during the parking space entering process or parking space exiting process as a function of dimensions of the vehicle and dimensions of the parking space.

9. The assistance system of claim 7, wherein the controller is further configured to set a threshold value a function of the dimensions of the vehicle and of the dimensions of the parking space when driving into a parking space when the following conditions are met:
  the parking space which is sufficiently large for the vehicle has been measured;
  the assistance system is activated;
  a reverse gear speed of the vehicle is engaged; and
  a steering intervention of the assistance system into a steering system of the vehicle is active.

10. The assistance system of claim 7, wherein the controller is further configured to set a threshold value as a function of the dimensions of the vehicle and of the dimensions of the parking space when driving out of a parking space when the following conditions are met:
  the parking space in which the vehicle is located has been measured;
  the assistance system is activated; a gear speed of the vehicle is engaged;
  a direction-of-travel indicator of the vehicle is activated; and
  a steering intervention of the assistance system into a steering system of the vehicle is active.

11. A vehicle comprising:
  an assistance system; and
  a steering system, wherein the assistance system comprises:
  a device for generating an indication;
  a controller; and
  at least one distance measuring sensor, wherein the at least one distance measuring sensor determines dimensions of a parking space in which the vehicle is located or in which the vehicle will be parked and the at least one distance measuring sensor determines a distance between the vehicle and an obstacle distance between the vehicle and an obstacle,
  wherein the assistance system generates the indication by the device, only when the assistance system senses, by the at least one distance measuring sensor, that a current distance between the vehicle and the obstacle is below a threshold value while entering or exiting the parking space, and
  wherein the controller sets the threshold value as a function of dimensions of the vehicle and dimensions of the parking space following the determination of a distance between the vehicle and the obstacle and following beginning of a first maneuver of a process for entering the parking space or for exiting the parking space.

12. The vehicle of claim 11, wherein the threshold value is set as a function of a difference between a length of the parking space and a length of the vehicle.

13. The vehicle of claim 11, wherein the controller is further configured to set a threshold value as a function of the dimensions of the vehicle and of the dimensions of the parking space when driving into a parking space when the following conditions are met:
  the parking space which is sufficiently large for the vehicle has been measured;
  the assistance system is activated;
  a reverse gear speed of the vehicle is engaged; and a steering intervention of the assistance system into the steering system of the vehicle is active.

14. The vehicle of claim 11, wherein the controller is further configured to set a threshold value as a function of the dimensions of the vehicle and of the dimensions of the parking space when driving out of a parking space when the following conditions are met:
- the parking space in which the vehicle is located has been measured;
- the assistance system is activated;
- a gear speed of the vehicle is engaged;
- a direction-of-travel indicator of the vehicle is activated; and
- a steering intervention of the assistance system into the steering system of the vehicle is active.

\* \* \* \* \*